Feb. 27, 1945.  C. W. REED  2,370,489
DUMP TRUCK
Filed Dec. 8, 1942  2 Sheets-Sheet 1
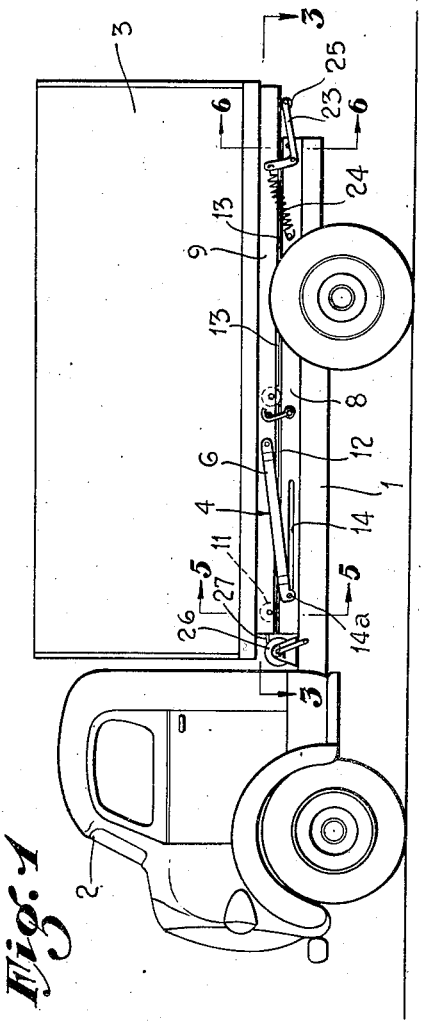
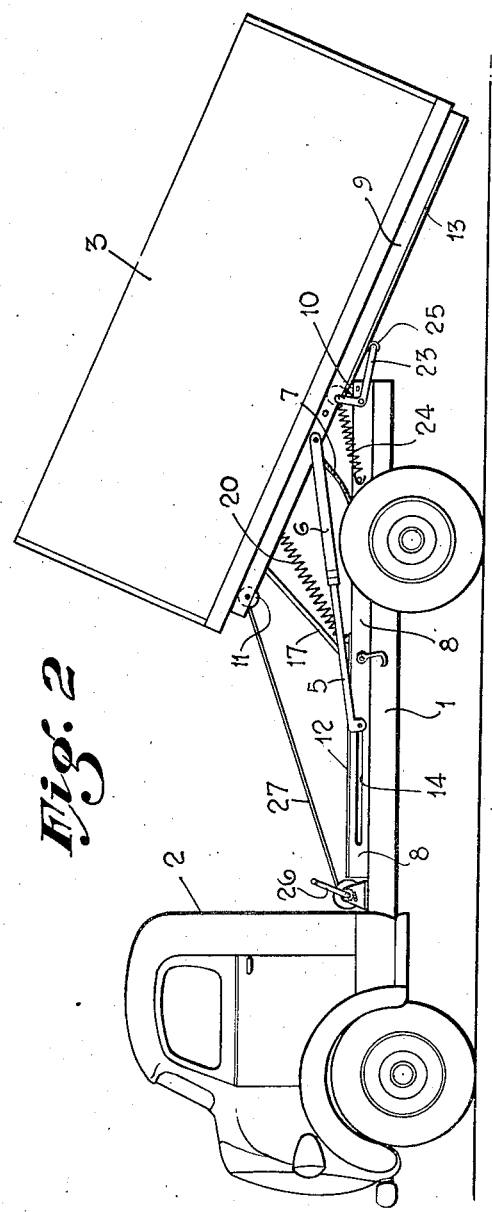
Inventor:
CHARLES W. REED,
By Larrabee
his Attorney.

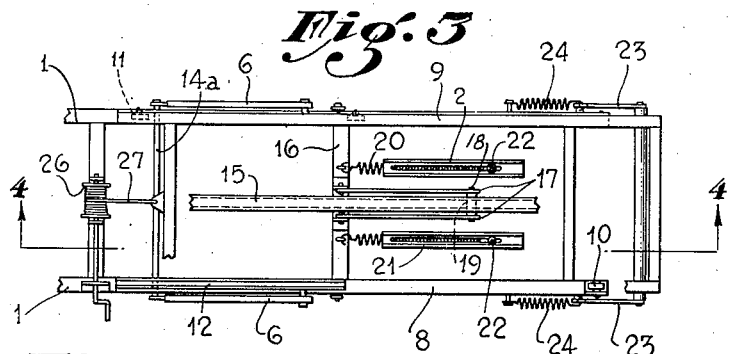

Patented Feb. 27, 1945

2,370,489

UNITED STATES PATENT OFFICE 2,370,489

DUMP TRUCK

Charles W. Reed, Los Angeles, Calif.

Application December 8, 1942, Serial No. 468,200

3 Claims. (Cl. 298—14)

My invention relates to a combined truck body and dump truck and particularly relates to tiltable containers adapted to receive a load and to discharge the load when desired by bodily tilting the container so that the load is enabled to slide or fall from the bottom of the container.

The invention is particularly designed for embodiment in a vehicle of the type known as a "dump truck" though such embodiment is not limitative of the invention.

The invention particularly relates to a dump truck in which the dump body is bodily moved over the truck bed frame and tilted by the action of gravity to dump the load carried by the body.

The object of the invention is to provide a construction in which the power required to operate the dumping of the load is reduced to a minimum.

A further object of the invention is to provide means for absorbing the shocks incident to rapid variation in load acting on the various parts of the weight carrying members and the structure generally.

A further object of the invention is to provide positive means for limiting the amount of movement of the dump body so preventing heavy stresses from being imposed upon the actuating mechanism.

A further feature of the invention is to provide a simple and sturdy construction subject to minimum wear and therefore capable of long life with a minimum expense for operation, maintenance and replacement of parts.

A further feature of the invention is that the weight of the load itself is utilized to cause tilting of the body thus avoiding the necessity of using hydraulic jacks to effect this tilting enabling a considerable saving in cost to be achieved.

A further feature of the invention is that resilient means are provided which are stressed by the forces acting to tilt the load, these stressed resilient means acting to counterbalance the weight of the emptied dump body and aid in restoring it to initial position.

A further feature of the invention is to provide means which act to retain the truck body in tilted position until forceably displaced by the operation of means acting to return the dump body to position ready to receive another load.

Other objects, advantages, and features of invention may appear from the accompanying drawings, the subjoined detail description, and the appended claims.

The accompanying drawings illustrate the invention in a form I at present deem preferable.

Figure 1 is a side elevation of a dump truck incorporating my invention, the body of the truck being shown in load carrying position.

Fig. 2 is a view similar to Fig. 1 but showing the body in dumping position.

Fig. 3 is a view in horizontal section on the line 3—3 of Fig. 1 looking in the direction of the arrows 3, 3.

Fig. 4 is a view in vertical section on the line 4—4 of Fig. 3 looking in the direction of the arrows 4, 4.

Fig. 5 is a fragmentary detail view in cross section on the line 5—5 of Fig. 1.

Fig. 6 is a fragmentary detail view in cross section on the line 6—6 of Fig. 1.

Fig. 7 is a fragmentary view in side elevation to an enlarged scale of the member acting to limit tilting movement of the body.

I indicates the longitudinal bed frames of a truck, 2 a driver's cab mounted at the forward end of the truck frame and 3 a load carrying body movably mounted on the truck bed frame. In the embodiment illustrated in the drawings the body 3 is arranged to be moved longitudinally backward, when it is desired to dump the load, until the center of gravity of the loaded body passes beyond the end of the bed frame whereupon the body will tilt and dump its load but it will be evident that the body can be arranged to be moved transversely across the truck bed frame to function as a side dumping truck instead of an end dumping truck by suitably arranging the cooperating elements of the mechanism to be hereinafter described.

Means 4 are arranged to effect rearward displacement of the body and though any suitable arrangement may be used I prefer known hydraulic cylinder and piston construction as diagramatically shown in which 5 indicates a piston and 6 a cylinder supplied with hydraulic fluid through a conduit 7 by a pump of any suitable form driven by the truck engine. As the details of these hydraulic elements form no part of my invention they are not more particularly described but the method of arranging the connection between the cylinder and piston and the tiltable body and truck bed frame are a feature of the invention and will be later described.

8 indicates lengths of channel iron mounted along each side member of the truck bed frame and 9 indicates similar channel members mounted longitudinally along the edge of the bottom of the body member. At the rear end of channel members 8 are mounted rollers 10 which bear against channel members 9 while at the forward ends of channel 9 rollers 11 are mounted bearing on the upper flange of channels 8, thus the body 3 is mounted for easy movement longitudinally of the truck bed frame.

I prefer to provide guide channels 12 mounted on the lower channel member 8 and 13 mounted on the upper channel member 9 to insure secure movement of the body and to aid in securing the body in the retracted position. The channels 12 and 13 are of sufficient length to engage rollers 8 and 9 during the portion of the relative movement of the parts as leave them in engagement.

It will be realized that when the body is moved rearward sufficiently to move the center of gravity of the body beyond the end of the truck bed the forward end of the truck will tend to tilt upwardly and to permit this movement, provision has to be made to allow the point of connection of the extending means 5, 6 to the frame 8 to move rearwardly and 14 indicates a slot in the channel member 8, 14a indicates a bolt and washer construction slidably connecting an end of the means 5, 6 to the channels 8, the connection 14a sliding along the slot as the forward end of the body 3 moves upward.

Since it is undesirable to impose unnecessary stresses on the extending means 5, 6, I provide means to limit the upward movement of the forward end of the body 3 before the force of the tilted body can be thrown on the fully extended means 5, 6 after these means have reached the limit of their travel. It is pointed out that the structure now being described is only one embodiment of the invention, various alternative constructions falling within the scope of the claims defining the invention will be later briefly referred to.

In Figs. 2, 3 and 4, 15 indicates a length of channel arranged to extend lengthwise of the underside of the truck body and secured thereto by bolts, 16 indicates a transverse body member of the truck frame and 17 indicates a link member pivoted at one end to the transverse member and slidably engaging the channel member at its other end. For explanatory purposes the link member is shown in Fig. 4 as comprising two bars pivoted at one end to the transverse body member and engaging the member 15 by a spacer and bolt 18, 19 indicating a slot extending lengthwise of the flanges of the channel member, the spacer and bolt extending from one bar through said slot to the other bar, the forward end of the slot is so positioned and the length of the link member is such that the body is retained at the desired angle to tilt to effect discharge of the load carried on the body until the link is relieved of the force exerted by the tilting of the body by the operation of means serving to return the body to initial position which means will be later described.

Since it is undesirable that the body should reach its final position with a heavy jar to the member 17 spring means 20 are arranged to come into operation when the body commences its tilting movement. The spring means 20 are shown in Figs. 2, 3 and 4 in which 21 indicates a pair of channel members attached to the underside of the body and extending longitudinally at each side of the channel member 15, and each provided with a slot. A fitting 22 is arranged to slide along each of channels 21 with an attachment element projecting through the slot, one end of each spring 20 is secured to said attachment elements while the other ends of the springs are secured to the transverse member 16. Springs 20 are of the extension type and while in fully retracted condition are of such a length that the fitting 22 is positioned at the rearward end of the slots in the channel members 21, but as the body is moved rearwardly the fittings 22 slide toward the front end of the slot until when the body commences to tilt upwardly the springs 20 are put into tension and serve to prevent the body reaching the limit of its tilting movement with a heavy jar.

It will be realized that to secure complete emptying of the body the tilted position of the body must be maintained against the pull of the springs 20 which would otherwise act to return the body to a horizontal position whenever the force exerted by the springs and any remaining portion of the load forward of the point of support becomes greater than that exerted by the overhanging portion of the body and any of the load remaining thereon, this retention of the tilted position is secured by the resistance to return to horizontal afforded by the link member in its raised position.

When the load is dumped the only force tending to tilt the body 3 is the weight of that portion of the body extending beyond its point of support by the truck frame and this force can be and preferably is counteracted by means comprising a pair of bell crank members 23 arranged at the end of the truck frame, a tension spring 24 secured at one end to the truck frame and at the other to one arm of the bell crank, a roller 25 carried by the other arm of each bell crank extends below and across the bottom of the body, the springs 24 are normally under tension and due to the further tension imparted to the spring by the downward tilting of the rear end of the truck body in the dumping position a considerable force is exerted tending to return the body to initial position.

Means are provided to return the body to load carrying position as shown in Figs. 1, 2 and 3, comprising a hand windlass 26 and line 27 secured at its free end to a transverse member on the underside of the body, the windlass serves to haul the body 3 forward on the truck body into load carrying position and when locked in position by the usual pawl and ratchet mechanism serves to hold the load carrying body against any rearward movement.

When the truck body is in its rearward tilted position, being maintained therein by the action of the link member 17, the initial pull of the line when it is desired to return the body to load carrying position serves to force the upper end of link 17 rearward along slot 18 whereupon the action of springs 20 aided by spring 24 brings the body to horizontal position with rollers 10 in engagement with frame members 1 and thereafter the windlass and line drag the body forwardly, telescoping the piston 5 and cylinder 6 and bringing all parts to initial position.

To hold the body 3 securely against forward movement and relieve the extending means 4 from jars caused by sudden stops of the truck I prefer to provide latching means 26a on the frame 8 engaging a stop 28 on the frame 9.

While I have described a simple and robust construction of dump truck in which the usual means provided in such trucks acting to elevate the forward end have been substituted by a simple and efficient use of the weight of the load to cause dumping, various alternative constructional embodiments of my invention may be readily devised and the scope of my invention embraces any such variations some of which will be given by way of example.

The dump truck controls could also be arranged so that all movements can be worked from the driver's cab and many other modifications may be devised without departing from the scope of my invention.

I claim:

1. Load conveying and dumping mechanism comprising a truck having an elongated frame, a dump body supported on said frame by anti-friction means, means for causing the dump body to move horizontally over said frame members until a portion of said body projects beyond the frame, means to return the body to initial position, the dump body tilting under the action of gravity when in the projecting position to dump the load, a link pivoted to the truck frame at one end and connected, with a certain amount of lost movement, at its other end to the dump body, the link acting to limit the amount of tilt of the dump body, and resilient means having a lost motion connection between the dump body and truck frame to cushion the tilting movement of the body when dumping the load.

2. A load conveying and dumping vehicle comprising an elongated wheeled frame, a dump body mounted for longitudinal movement on said frame, a hydraulic cylinder and piston connected to the body at one end and having a lost motion connection to the truck frame, means for supplying hydraulic fluid under pressure to said cylinder to effect longitudinal rearward movement of said dump body until sufficient of the dump body projects beyond the end of the frame to cause tilting of the dump body to dump the load, a link member pivoted at one end to the truck frame and having a lost motion connection to the dump body the link member serving to limit the amount of tilting movement of the truck body and to prevent undesirable stress from being imposed upon the hydraulic cylinder and piston, and a windlass mounted toward the front end of the frame and a line wound on said windlass and attached to said dump body whereby said dump body is brought back to initial position and secured against rearward movement.

3. A load conveying and dumping vehicle comprising an elongated wheeled frame, a dump body comprising frame members overlying the truck frame members, roller means carried by the truck frame members toward the end thereof and bearing against the body frame members and serving both as anti-friction means and as a fulcrum about which the body may tilt, roller means carried by the dump body frame members and adapted to bear against the frame members of the truck, hydraulic cylinder and piston means atttached at one end to the dump body and at the other end by means of a lost motion connection to the truck frame members, and acting to move the body to tilting position and dump the load, means for supplying hydraulic fluid under pressure to said hydraulic cylinder, means acting to limit the tilting movement of the truck body, resilient means acting to cushion the truck body on reaching its upward limit in tilting position, said means acting to limit the upward tilting movement of the truck body acting also to maintain the truck body in tilted position, a link member pivoted at one end to the truck frame and having a lost motion connection to the dump body, and a windlass and line arrangement to effect return of the dump body to initial position, operation of said windlass and line acting to displace the link member to initial position to permit the tilted body to reassume a horizontal position and to hold the dump body against rearward movement while in said horizontal position.

CHARLES W. REED.